July 11, 1933.  C. BUDKE  1,917,696

CONTINUOUS PRESSURE FILTER

Filed June 12, 1931     5 Sheets-Sheet 1

Inventor
Carl Budke,

By *Clarence A. O'Brien*
Attorney

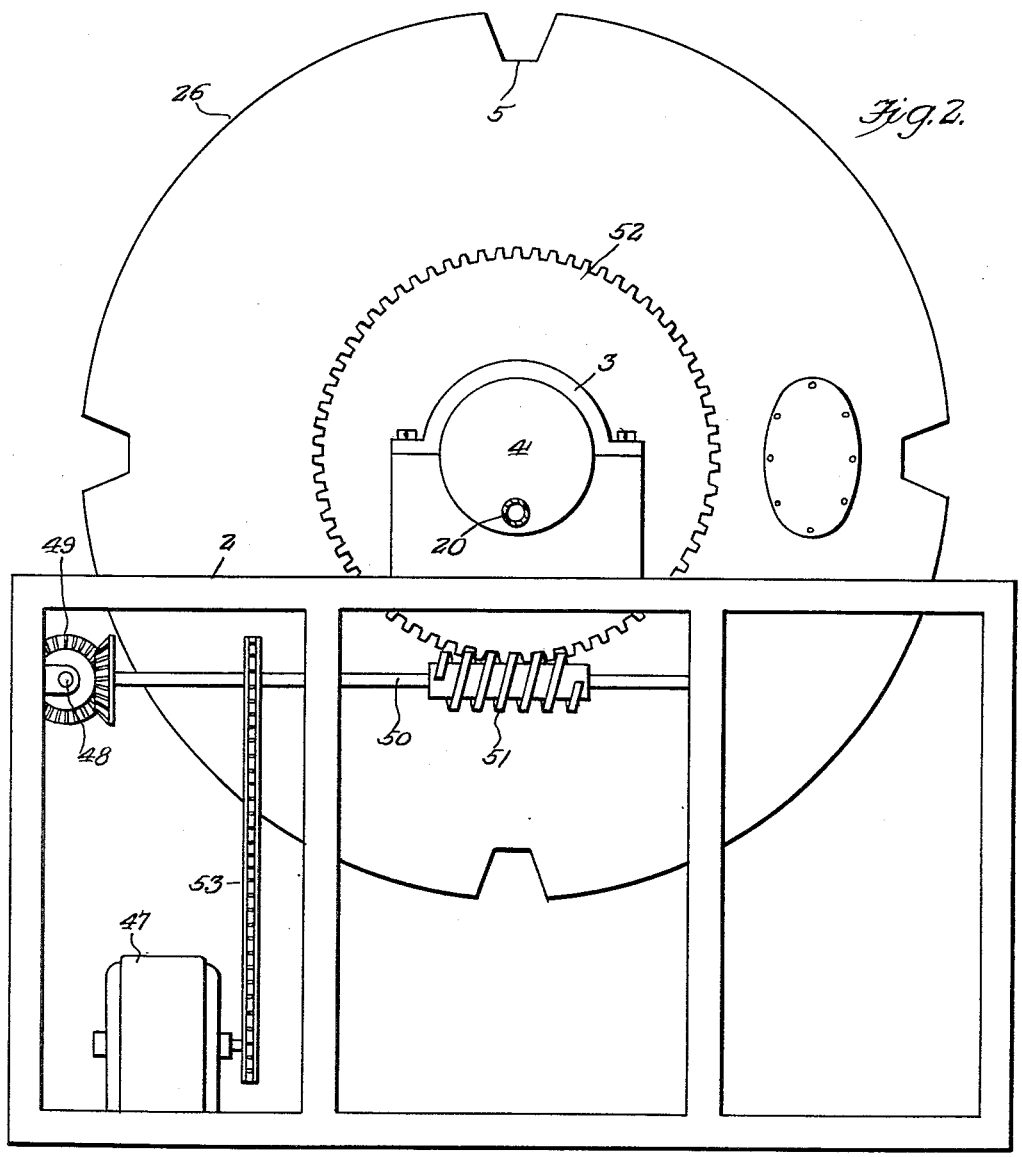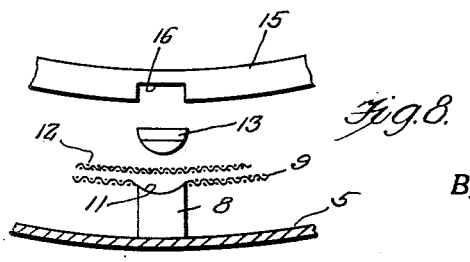

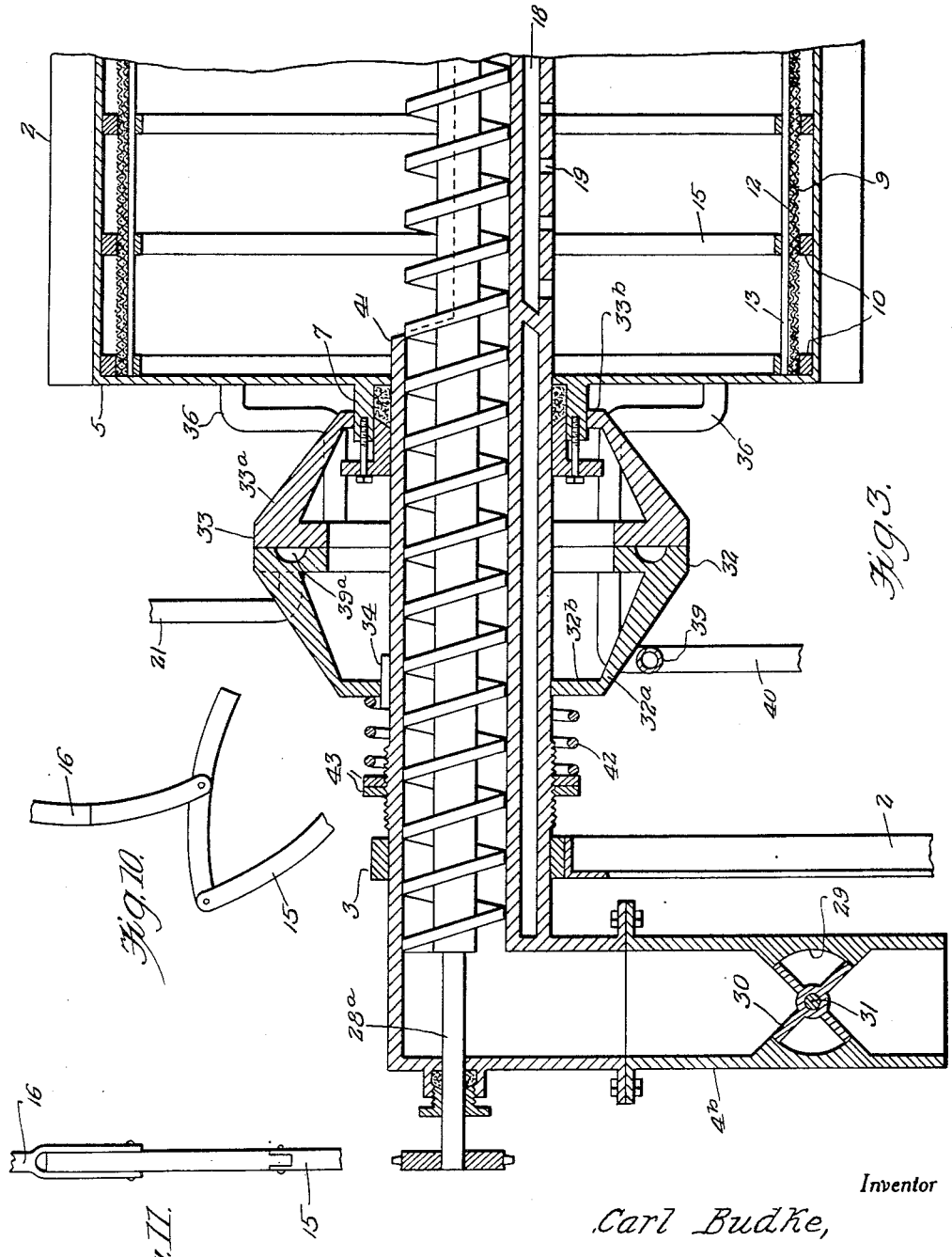

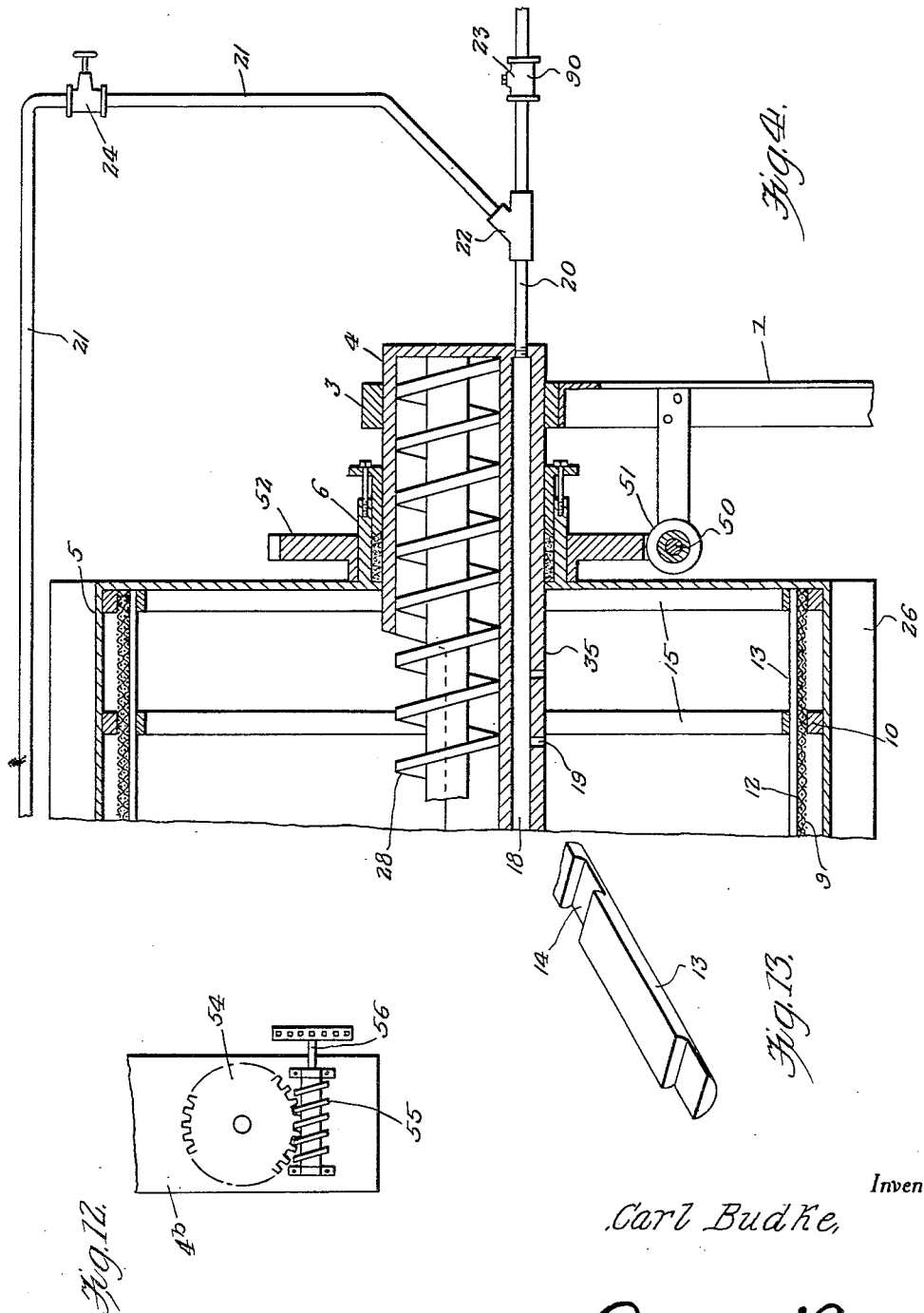

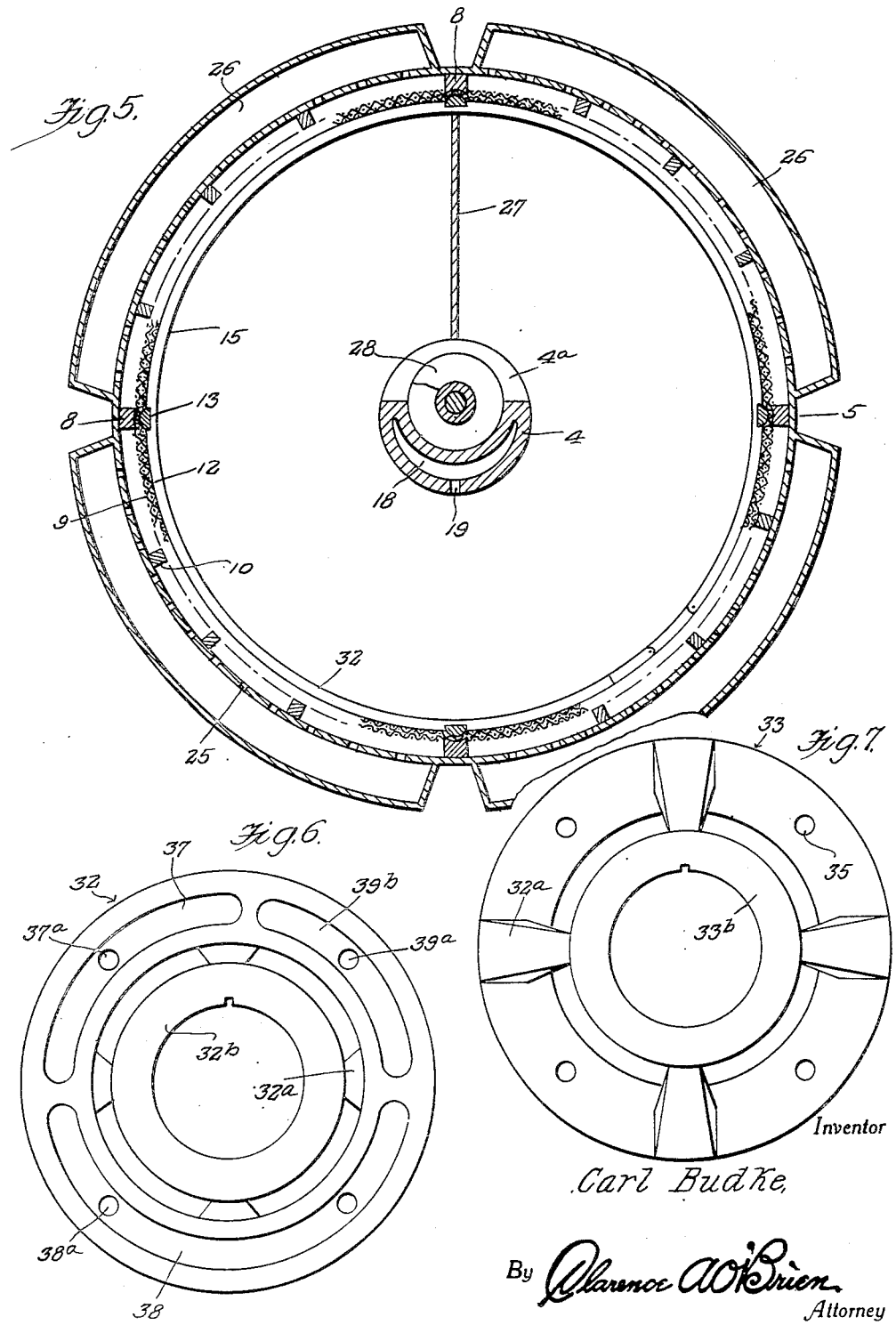

Patented July 11, 1933

1,917,696

UNITED STATES PATENT OFFICE

CARL BUDKE, OF MAYFIELD, KENTUCKY

CONTINUOUS PRESSURE FILTER

Application filed June 12, 1931. Serial No. 543,939.

This invention relates to certain new and useful improvements in filters, and the primary object of this invention is to provide a pressure filter having all the advantages of a vacuum filter, without the objectionable features of such a filter.

A still further object of the invention is to provide a filter of the character above mentioned whereby a high and continuous pressure may be used for filtering purposes.

A still further object of the invention is to provide a filter of the character above mentioned especially adaptable to the filtering of liquids of a high viscosity, such as oils, syrups, and certain chemicals.

I attain the above objects through the combination and arrangement of elements, shown in the accompanying drawings, hereinafter described in detail, and more specifically pointed out in the claims.

In the drawings:

Figure 2 is a similar view of the intake end of the filter.

Figure 3 is a fragmentary sectional elevational view through the filter at the discharge end thereof.

Figure 4 is a view similar to Figure 3 through the intake end of the filter.

Figure 5 is a transverse sectional view through the fixed tube and rotary cylinder supported thereon.

Figure 6 is a plan view of a fixed valve plate.

Figure 7 is a similar view of a rotatable valve plate.

Figure 8 is a fragmentary detail sectional elevational view showing the manner of securing the filtering cloth within the cylinder, the retaining ring, bar, filtering cloth, and other associated parts being separated.

Figure 9 is a fragmentary detail sectional elevational view through the fixed end rotatable valve plates for clearly illustrating certain details of construction to be hereinafter more fully referred to.

Figure 10 is a fragmentary side elevational view of an expanding or retaining ring.

Figure 11 is an edge elevational view thereof.

Figure 12 is a fragmentary elevational view of the lower portion of the tube discharge extension showing the drive means for the blades of an airlock.

Figure 13 is a fragmentary perspective view of a retaining bar.

Figure 1:
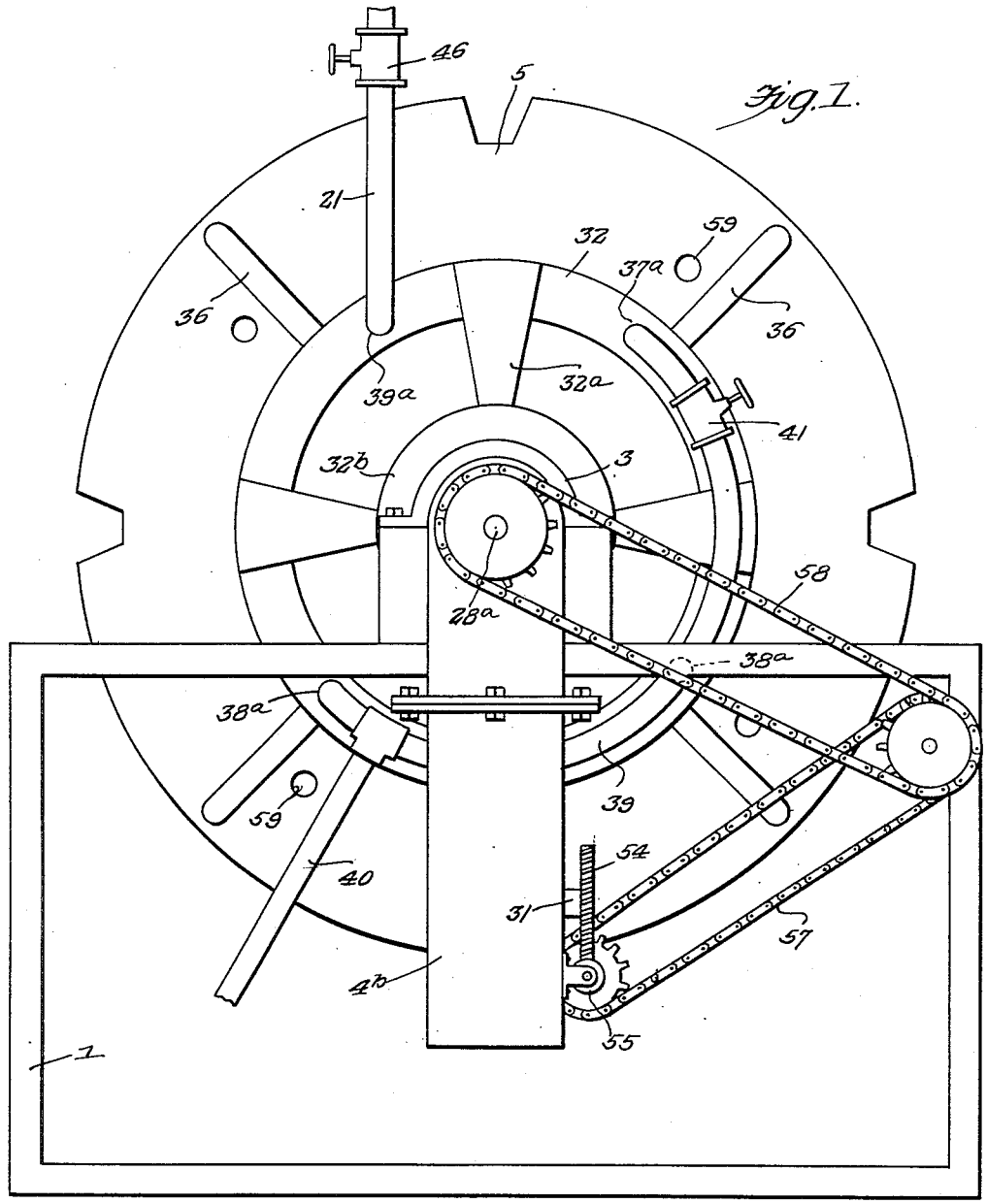
Figure 1 is an elevational view of the discharge end of the filter.
Figure 9:
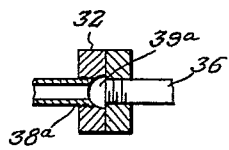

Referring more in detail to the drawings, it will be seen that the filtering device comprises an elongated tube 4, the ends of which are supported in bearings 3 provided on opposed supports 1 and 2. A cylinder 5 is rotatably supported on the tube 4 and at each end is provided with stuffing boxes 6 and 7 receiving said tube.

Provided on the inner face of the peripheral wall of the cylinder is a circular series of relatively spaced cleats 8 between which and secured thereto are sheets of wire fabric 9 retained in spaced relation to the peripheral wall of the cylinder by relatively spaced ribs 10 arranged in series between the cleats 8.

Each of the cleats 8 is provided with a grove 11 for receiving a portion of a suitable filtering coth 12 that extends in a tubular manner within the cylinder 5 from substantially one end to the other of the cylinder. Cooperating with the grooves of the cleats 11 for retaining the filtering cloth in position are suitable retaining bars 13 each of which is provided with a convex face conforming to the cross sectional shape of a groove 11 and a flat face provided with relatively spaced notches 14. The bars 13 are retained in operative position with respect to the grooves 11 through the medium of a plurality of expansible retaining rings 15 each of which is provided with a series of relatively spaced notches 16 for engagement with the notches 14 of the bars 13 when the rings 15 are expanded.

Each ring 15 is provided with a suitable operating lever 16. The tube 4 in the bottom wall thereof is provided with a passage 18 extending for substantially the full length thereof, and the bottom of the passage is provided with a longitudinal series of relatively spaced apertures 19 progressively increasing in diameter from the intake end of the passage 18.

The material to be filtered is fed to the passage 18 from a suitable source of supply through a feed pipe 20 connected to the tube 4 at one end of the passage 18. Compressed air is fed to the material to be filtered subsequent to the passage of the material from the pipe 20 to the passage 18 through the medium of a conduit pipe 21 leading from a suitable source of air supply and connected as at 22 to the pipe 20. The compressed air will serve to agitate the material to be filtered, and also will prevent clogging of the passage 18 by such material. A suitable check valve 23 is arranged in the pipe 20, to prevent the material to be filtered from being forced back to the source of supply through the pipe 20. A suitable control valve is also arranged in the pipe 21 and is designated by the reference character 24.

The material to be filtered will then pass from the passage 18 through the openings 19 into the cylinder 5, and during rotation of the cylinder 5 at a relatively low speed in a counter clockwise direction, the solids of the material will adhere to and form cakes on the filtering cloths 12. At the same time, the liquid portion of the material being filtered will pass through the cloths 12, screen 9, and through perforations 25 provided in the peripheral wall of the cylinder into chambers 26, relatively spaced in a circular series about the cylinder and extending for substantially the full length of the cylinder.

Within the cylinder 5, the tube 4 at the top thereof is opened for a considerable portion of its length, as at 4a. A knife 27 extends longitudinally across the open top of the tube 4 and is suitably secured to the tube. The knife 27 extends radially and at its free longitudinal edge is adapted to contact the cakes formed on the filtering cloth 12, for removing the cakes from the cloth as the cylinder rotates and directs the removed cakes into the tube 4 to be conveyed toward the depending discharge extension 4b of the tube through the medium of an auger 28 suitably arranged in the tube 4.

The cakes discharging from the discharge extension 4b first pass through an "airlock" provided adjacent the lower end of the extension 4b and consisting of a chamber provided in said extension having concave walls 29 with which contact the machined edges of blades 30 radiating from a hub at a substantially forty five degree angle relative to one another whereby loss of air during discharge of the cake is prevented. The hub carrying the blade 30 is keyed to a suitable shaft 31.

Circumjacent the tube 4 adjacent the discharge extension 4b thereof is a pair of annular valve plates 32, 33. The plate 32 has arms 32a extending laterally therefrom and merging into a ring 32b keyed to the tube 4 as at 34.

The ring 33 has arms 33a extending laterally therefrom and merging into a ring 33b suitably keyed to the adjacent stuffing box 7.

Plate 33 is also provided with a series of spaced openings 35 with which are suitably connected pipes 36 leading from the chambers 26. Thus the aforementioned liquid in the chambers 26 are conveyed through the pipes 36 to arcuate channels or recesses 37 and 38 provided on one face of the valve plate 32.

The channel or recess 37 is provided with a single opening 37a, while the channel or recess 38 is provided with a pair of relatively spaced openings 38a. The liquid from the channels 37 and 38 passes through the openings 37a, 38a to a manifold pipe 39 to be connected from the filtering machine to any suitable location through a discharge pipe 40 connected with the manifold pipe 39.

Arranged within the manifold pipe 39 is a suitable valve 41. Valve plate 32 is normally urged toward valve plate 33 through the medium of a spring 42 interposed between the ring 32b and a pair of lock nuts 43 threaded on the tube 4. It will be thus noted, that the valve plate 32 provides a closure for the open side of the channels of the valve plate 33.

A compressed air pipe 21 is also connected at one end with a hole 39a provided in the fixed valve plate 32 intermediate the ends of a channel or recess 39b formed on said valve plate 32 whereby to provide a back pressure of air through the concave recesses or channels 37, 38, 39b, and through the pipes 36 that connect said recesses with the chambers 26, the air passing from said chambers through the perforations 25, filtering screen 9, and filtering cloth 12 into the cylinder 5, each time a hole 35 in the valve plate 33 registers with the hole 39a of the valve plate 32, whereby to free the filtering cloth from clinging particles adhering thereto after a cake has been removed therefrom by the knife 27, so that, that particular portion or section of the cloth will be in proper condition to permit, without impairment, the formation thereon of a second cake. This back pressure of air into the cylinder 2 also, as is thought apparent, permeates the interior of the cylinder and facilitates the drying of the particles of solid matter caked on the filtering cloth 12.

This back pressure of air is controlled by a suitable valve 46 arranged in the pipe 21.

From what has been hereinbefore described, it will be seen that in operation, a mixture of the material to be filtered, and air under pressure is forced from the pipe 20 into the passage 18 and passes from the passage through the openings 19 into the cylinder 5. The solid particles of the material will have a tendency to cling to the filtering cloth 12, while the liquid portion of the material will pass through the filtering cloth, screen, and perforations 25 into the chambers 26. This straining process of the material results in the formation of cakes on the filtering cloth 12, and valve 41 being opened, it will be seen that the liquid from the chambers 26 will pass through the pipes 36, and from the recesses in the valve plate 33 through the pipe 39 to be discharged therefrom through the pipe 40.

As the cylinder 5 continues to slowly rotate, the cakes of solid material adhering to the filter cloth 12 will be raised above the liquid level in the cylinder 5, and will be removed from the cloth 12 by the blade 27 to be guided by the blade into the tube 4 for conveyance by the auger 28 to the discharge extension 4b discharging from the extension 4b subsequent to their passage through the air lock before described in detail. During this operation, valve 46 in pipe 21 will be opened so as to provide for the back pressure of air as before described in detail for cleaning the filtering cloth and for facilitating the drying of the cake formation thereon.

In this connection, it will be also noted, that the valve plate 33 keyed to the stuffing box 7 will rotate with the cylinder 5 whereby the ports 35 are brought into successive registry with the port 39a, with the result that this back pressure above referred to of air will only take place intermittently and in suitable timed relation with respect to the removal of the cakes by the blade 27.

The cylinder 5, auger 28, and shaft 31 of the air lock, are all driven simultaneously from a suitable electric motor 47. In this connection, it will be noted that the supports 1 and 2 are provided with suitable bearings within which are journalled the ends of a longitudinal shaft 48. Shaft 48 has a suitable gear connection 49 with a transverse shaft 50 supported on bearings mounted on the support 2. Shaft 50 is provided with a worm 51 in mesh with a suitable gear wheel 52 suitably splined to the stuffing box 6 whereby power is transmitted to the cylinder 5. The shaft 50 is driven from the motor 47 through the medium of suitable chain and sprocket means 53. The blade carrying shaft 31 is provided with a worm wheel 54 in mesh with a worm 55 on a shaft 56 suitably journalled in bearings provided therefor on the discharge extension 4b. Power from shaft 48 is transmitted to the shaft 56 through the medium of suitable chain and sprocket means 57. Power from the shaft 48 is also transmitted to the end 28a of the auger shaft through the medium of chain and sprocket connection 58. Thus it will be seen that suitable means is provided for driving the rotating parts of the filtering machine.

During operation of the filtering machine care must be taken to prevent the level of the liquid in the cylinder 5 rising so as to spill into the tube 4 which would result in contaminating the solids being conveyed by the auger 28. To this end, suitable sight openings 59 are provided in an end wall of the cylinder 5. These sight openings 59 may be closed by a glass panel or other transparencies.

Thus it will be seen that I have provided a filter that is capable of discharging not only the solids separated from the material to be filtered but also the liquid part of such material, the discharge of the liquid being such as to facilitate the drying of the solid particles of the material being treated. It will be also appreciated, that a filter embodying the features of the present invention is especially adapted for filtering liquids of a high viscosity, such as oils, syrups and certain chemicals because of the high pressure feature of this filter. Further, a pressure filter constructed in accordance with the present invention, will have all the advantages of a vacuum filter, and will prove more efficient that a vacuum filter, in that a higher pressure may be used in a filter constructed in accordance with the present invention.

Even though I have herein shown and described the preferred embodiment of my invention, it is to be understood that the same is susceptible of further changes, modifications and improvements coming within the scope of the appended claims.

Having thus described my invention, what I claim as new is:

1. In a filter device of the class described, a stationary tubular member having an elongated chamber in its lower part, the bottom wall of which is provided with perforations, a cylinder rotatably arranged on an intermediate part of the tubular member and enclosing that part which is provided with the perforations, a cylindrical filtering medium in the cylinder and spaced from the circumference thereof, the circumferential part of the cylinder having perforations therein, a chamber forming member connected with the cylinder for receiving liquid passing through the perforations therein, means for introducing the liquid to be filtered into the chamber of the tubular member under pressure, whereby said liquid will pass through the perforations in the walls of the said chamber, and thus enter the cylinder, that part of the tubular member within the cylinder having an elongated opening in its upper portion, an upwardly projecting blade attached to the upper part of the tubular member for scraping the solids from the filtering medium, and guiding the same through the opening into the tubular member, means for conveying the solids thru the tubular member and discharging them therefrom and means for discharging the liquid collecting in the chamber attached to the cylinder.

2. In a filter device of the class described, a stationary tubular member having an elongated chamber in its lower part, the bottom wall of which is provided with perforations, a cylinder rotatably arranged on an intermediate part of the tubular member and enclosing that part which is provided with the perforations, a cylindrical filtering medium in the cylinder and spaced from the circumference thereof, the circumferential part of the cylinder having perforations therein, a chamber forming member connected with the cylinder for receiving liquid passing through the perforations therein, means for introducing the liquid to be filtered into the chamber in the tubular member under pressure, whereby said liquid will pass through the perforations in the walls of the said chamber, and thus enter the cylinder, that part of the tubular member within the cylinder having an elongated opening in its upper portion, an upwardly projecting blade attached to the upper part of the tubular member for scraping the solids from the filtering medium, and guiding the same through the opening into the tubular member, means for conveying the solids through the tubular member and discharging them therefrom, means for discharging the liquid collecting in the chamber attached to the cylinder, and means for intermittingly forcing air into the last-mentioned chamber.

3. In a filter device of the class described, a stationary tubular member having an elongated chamber in its lower part, the bottom wall of which is provided with perforations, a cylinder rotatably arranged on an intermediate part of the tubular member and enclosing that part which is provided with the perforations, a cylindrical filtering medium in the cylinder and spaced from the circumference thereof, the circumferential part of the cylinder having perforations therein, a chamber forming member connected with the cylinder for receiving liquid passing through the perforations therein, means for introducing the liquid to be filtered in the chamber of the tubular member under pressure, whereby said liquid will pass through the perforations in the walls of the chamber, and thus enter the cylinder, that part of the tubular member within the cylinder having an elongated opening in its upper portion, an upwardly projecting blade attached to the upper part of the tubular member for scraping the solids from the filtering medium, and guiding the same through the opening into the tubular member, means for conveying the solids through the tubular member and discharging them therefrom, means for discharging the liquid collecting in the chamber attached to the cylinder, comprising an annular member attached to the cylinder, a pipe leading from the last mentioned chamber to said member, said member having a port passing from one face thereof to the other face with which port the outer end of the pipe is connected, a stationary annular member contacting the first annular member and having arc-shaped grooves in that face which contacts the first member, discharge means connected with some of said grooves and valve controlled means introducing compressed air into another one of said grooves, whereby the compressed air will be intermittently conveyed to the liquid chamber attached to the cylinder.

4. In a filter device, a cylinder having perforations in its circumferential part, longitudinally extending strips attached to the inner walls of the cylinder, and some of which have their free edges grooved, sheets of wire fabric supported by the strips, a filtering cloth placed on the inner face of said fabric, bars pressing the cloth into the grooves of the strips, expansible ring members engaging the cloth and holding the bars in the grooves, and means for expanding and contracting said ring members.

5. In a filter device of the class described, a perforated cylinder, a filter medium cylindrical in shape placed in the cylinder and spaced from the perforated circumferential portion thereof, a number of longitudinally extending chamber forming members connected with the outer wall of the circumferential part of the cylinder for receiving the liquid passing through the perforations therein, a ring-member attached to one end of the cylinder and having ports passing therethrough, a pipe connecting each port with a chamber forming member, a stationary ring member contacting the first ring member and having arcuate-shaped grooves in its contacting face for registering with the port during the rotary movement of the first ring member, discharge means connected with some of the grooves, and means for forcing compressed air into another groove whereby said air will be intermittently conveyed to the chamber forming member.

In testimony whereof I affix my signature.

CARL BUDKE.